(12) United States Patent
Mukherjee et al.

(10) Patent No.: US 8,208,550 B2
(45) Date of Patent: Jun. 26, 2012

(54) ADAPTING AN ENCODED VIDEO SIGNAL TO ENCODING COMPLEXITY

(75) Inventors: Debargha Mukherjee, Sunnyvale, CA (US); Yuxin Liu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1365 days.

(21) Appl. No.: 11/888,135

(22) Filed: Jul. 31, 2007

(65) Prior Publication Data
US 2009/0034619 A1    Feb. 5, 2009

(51) Int. Cl.
*H04N 7/12* (2006.01)
(52) U.S. Cl. .............................. 375/240.16; 375/240.12
(58) Field of Classification Search .............. 375/240.16
See application file for complete search history.

(56) References Cited

U.S. PATENT DOCUMENTS

| | | | |
|---|---|---|---|
| 6,167,087 A * | 12/2000 | Kato | 375/240.03 |
| 6,493,386 B1 | 12/2002 | Vetro et al. | |
| 7,453,941 B1 * | 11/2008 | Yamori et al. | 375/240.15 |
| 2003/0219160 A1 * | 11/2003 | Song et al. | 382/236 |
| 2004/0190615 A1 * | 9/2004 | Abe et al. | 375/240.15 |
| 2005/0063465 A1 * | 3/2005 | Cote et al. | 375/240.12 |
| 2007/0009047 A1 * | 1/2007 | Shim et al. | 375/240.26 |
| 2007/0211801 A1 * | 9/2007 | Matsubayashi | 375/240.16 |

OTHER PUBLICATIONS

Espacenet search, Espacenet Result list, Aug. 2011.*
Espacenet citation, Espacenet list of all citation, Aug. 2011.*
IPRP PCT Report, PCT report, Sep. 2011.*
PCT Search Report, International Search Report, Sep. 2011.*

* cited by examiner

*Primary Examiner* — Jung Kim
*Assistant Examiner* — Shan Elahi

(57) ABSTRACT

Techniques for adapting an encoded video signal to a complexity of video encoding may be used to reduce a bit rate of an encoded video signal when the complexity is reduced. Video communication according to the present techniques includes adapting an encoded video signal to an encoding complexity used to derive a set of encoded data from a series of video frames.

16 Claims, 3 Drawing Sheets

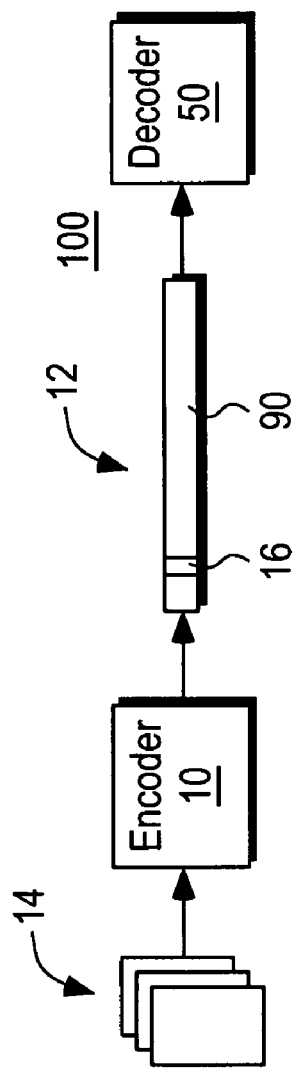
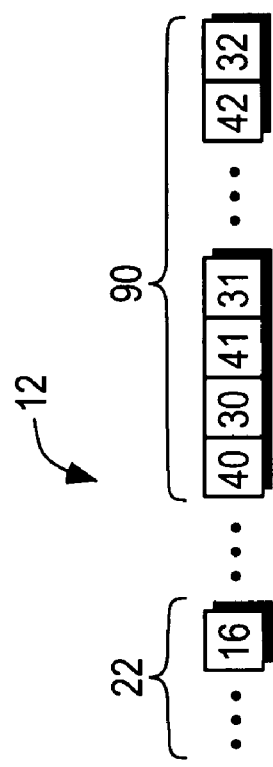

ADAPTING AN ENCODED VIDEO SIGNAL TO ENCODING COMPLEXITY

CROSS-REFERENCE TO RELATED APPLICATIONS

This patent application claims priority under 35 U.S.C. §119(e) from the U.S. provisional patent application filed Jul. 22, 2007 with U.S. application No. 60/961,594 entitled "Adapting an Encoded Video Signal to Encoding Complexity," with inventors Debargha Mukherjee and Yuxin Liu and which is hereby incorporated by reference.

BACKGROUND

Video encoding may be employed to reduce an amount of data in a video. For example, video encoding may be used to transform a series of video frames of a video into an encoded video signal that carries substantially fewer bits than the original video frames while retaining much of the visual information contained in the original video frames.

Video encoding may include decomposing each video frame of a video into a set of sub-blocks, known as macro-blocks, encoding each macro-block, and sending each encoded macro-block in an encoded video signal along with a set of mode bits for each encoded macro-block that specify a prediction mode for the corresponding encoded macro-block. Prediction modes may include INTER modes for prediction among adjacent frames, e.g. motion estimation, and INTRA modes for predicting video content within individual video frames.

A video encoder may alter encoding complexity in response to a variety of encoding constraints. For example, a video encoder may alter encoding complexity by increasing or decreasing the number of prediction modes searched when encoding the macro-blocks of a video frame. When fewer modes are searched in the interest of complexity, the bit-rate typically increases for the same desired quality resulting in a loss of efficiency. Unfortunately, prior video encoding systems do not provide such mechanisms for adapting a video encoding signal to changes in encoding complexity and addressing the loss of efficiency.

SUMMARY OF THE INVENTION

Techniques are disclosed for adapting an encoded video signal to a complexity of video encoding. These techniques may be used to reduce a bit rate of an encoded video signal when the complexity is reduced. Video communication according to the present techniques includes adapting an encoded video signal to an encoding complexity used to derive a set of encoded data from a series of video frames.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 1 shows a video system that incorporates the present teachings;

FIG. 2 illustrates an encoded video signal according to the present teachings;

DETAILED DESCRIPTION

Figure 3A:
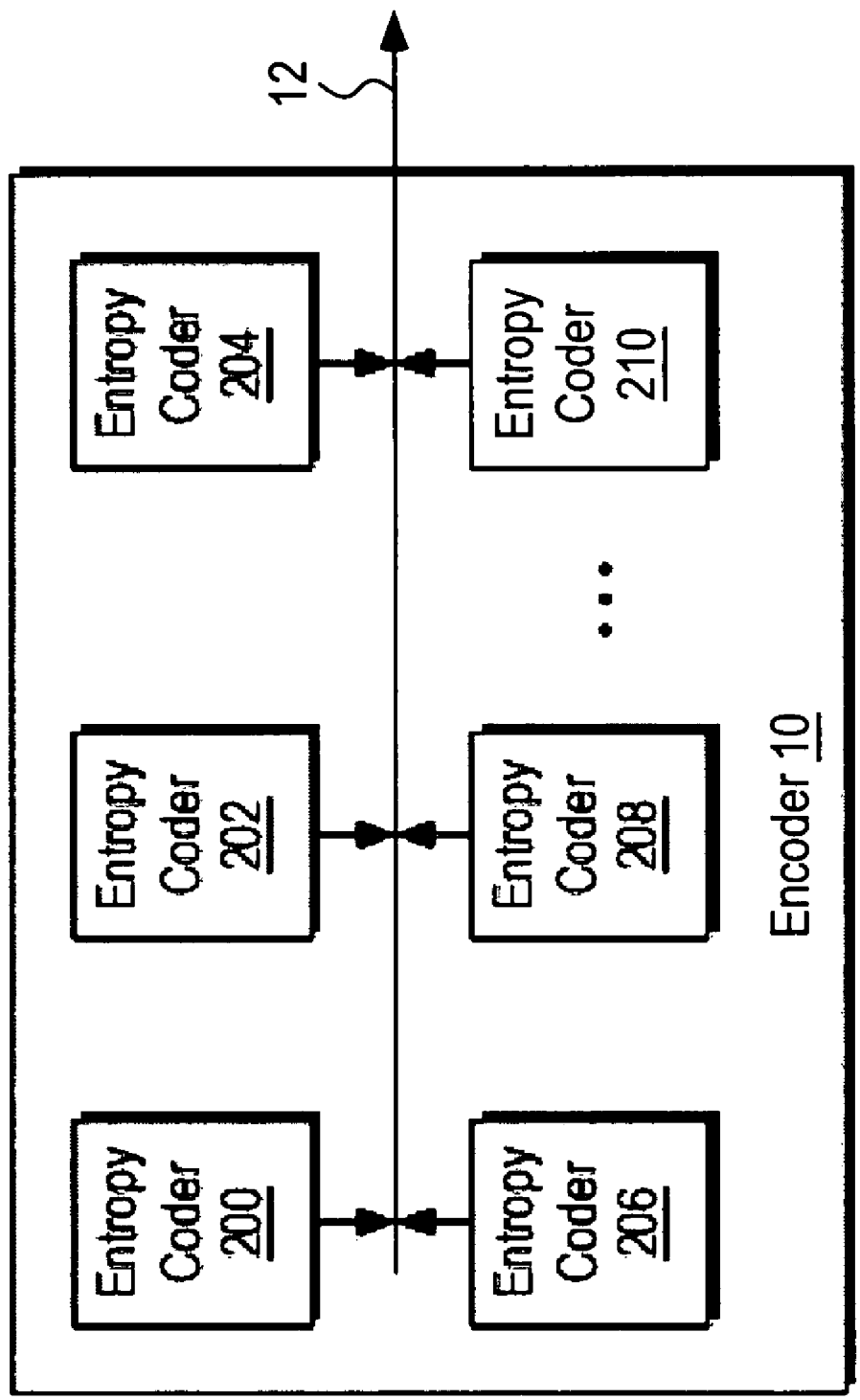
FIGS. 3a-3b shows a set of entropy coders in an encoder and a set of entropy decoders in a decoder.

FIG. 1 shows a video system 100 that incorporates the present teachings. The video system 100 includes an encoder 10 that adapts an encoded video signal 12 to an encoding complexity used to derive a set of encoded data 90 from a series of video frames 14. The video system 100 includes a decoder 50 that evaluates the encoded video signal 12 in response to the encoding complexity specified in the encoded video signal 12.

The encoded video signal 12 includes a set of syntax bits 16 for adapting the encoded video signal 12 to a desired encoding complexity based on restricted subset of a set of possible prediction modes. The restricted subset of the prediction modes may be based on complexity costs associated with implementing the prediction modes in the encoder 10.

Adapting of the encoded video signal 12 enables a reduction in a bit rate of the encoded video signal 12 when the complexity is reduced. The decoder 50 reconstructs the video frames 14 from the encoded video signal 12 by evaluating the prediction modes identified in the encoded data 90 using the syntax bits 16.

FIG. 2 illustrates the encoded video signal 12 in one embodiment. The encoded data 90 in the encoded video signal 12 includes a series of encoded macro-blocks 30-32 and corresponding mode indicators 40-42. Each mode indicator 40-42 identifies a prediction mode for decoding the corresponding encoded macro-block 30-32. For example, the mode indicator 40 identifies a prediction mode for the encoded macro-block 30.

The syntax bits 16 are carried in a higher level 22 of the encoded video signal 12, i.e. in a level above a level that carries the encoded macro-blocks 30-32 and corresponding mode indicators 40-42, so that the decoder 50 may readily apply the syntax bits 16 to all of the mode indicators 40-42. The higher level 22 may be a slice level, a frame level or group of pictures (GOP) level of the encoded video signal 12 according to a video encoding standard. The encoded video signal may include provisions for carrying the syntax bits 16 in multiple levels of the bit-stream, where information at the lower levels is used to supercede the information at the higher levels.

The syntax bits 16 inform the decoder 50 of a subset of a set of possible prediction modes that were searched by the encoder 10 when it generated the encoded macro-blocks 30-32 so that the decoder 50 may properly evaluate the mode indicators 40-42. For example, a video encoding standard to which the encoder 10 and the decoder 50 comply may have provisions for n prediction modes and at some point in time the encoder 10 may search only m of those n possible prediction modes, where m<=n. The encoder 10 uses the syntax bits 16 to signal to the decoder 50 the m prediction modes that were searched when the encoded macro-blocks 30-32 were generated. The encoder 10 generates the mode indicators 40-42 using an entropy coder that corresponds to the subset of prediction modes indicated in syntax bits 16. The decoder 50 evaluates the mode indicators 40-42 using the entropy decoder corresponding to the subset indicated in the syntax bits 16. Generally speaking, each subset indicated in syntax bits 16 correspond to an entropy encoder and decoder pair that are used to encode and decode the mode indicators 40-42 in the encoder and decoder respectively.

The information provided in the syntax bits 16 enable adaptation of the mode indicators 40-42 to the number of prediction modes m. In an example in which fixed length binary encoding is used, if m=32 then each mode indicators 40-42 consumes 5 bits in the encoded video signal 12, whereas if m=8 then each mode indicator 40-42 only consumes 3 bits in the encoded video signal 12. This can yield substantial bit savings in the encoded video signal 12 because there are numerous of the mode indicators 40-42 in the encoded video signal 12. Generally, this applies to any entropy coder-decoder pair that is used for the mode indicators.

The specific subset m of the n possible prediction modes may be indicated in the syntax bits 16 by an n-bit bit-map. For example, if n=5, then a bit-map of 11001 carried in the syntax bits 16 indicates that only the 1st, 2nd and 5th prediction modes were searched by the encoder 10 when generating the encoded macro-blocks 30-32. The bit-map in the syntax bits 16 enable the decoder 50 to map the mode indicators 40-42 into the actual prediction modes of the n possible when decoding the encoded macro-blocks 30-32. In this example, a value of 1 for the mode indicator 40 informs the decoder 50 that the first prediction mode applies to the encoded macro-block 30 and a value of 3 for the model indicator 41 informs the decoder 50 that the $5^{th}$ prediction mode applies to the encoded macro-block 31.

Figure 3B:
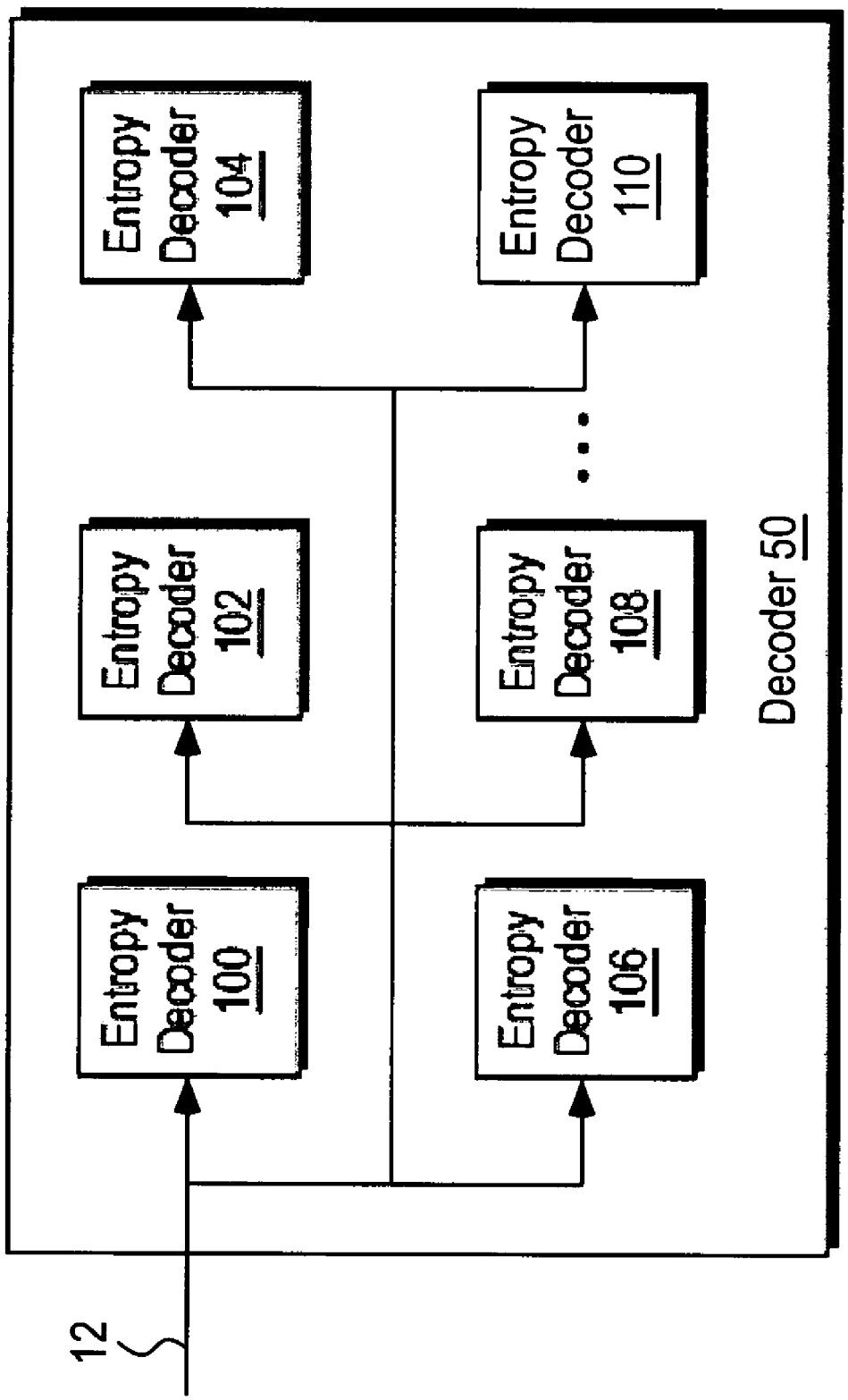

FIGS. 3$a$-3$b$ shows a set of entropy coders 200-210 in the encoder 10 and a set of entropy decoders 100-110 in the decoder 50. Each entropy coder 200-210 corresponds to a possible selection of m prediction modes from the n possible prediction modes. Similarly, each entropy decoder 100-110 corresponds to a possible selection of m prediction modes from the n possible prediction modes so that the entropy decoder 100 corresponds to the entropy coder 200 and the entropy decoder 102 corresponds to the entropy coder 202, etc.

The total number of entropy coders 200-210 is equal to the number of possible subset selections i.e. is equal to $2^n-1$, where the trivial case of no modes selected has been dropped. Similarly, the total number of entropy decoders 100-110 is equal to $2^n-1$.

For the above example of n=5 there are 31 entropy coders in the encoder 10 because there are 31 possible 5-bit bit-maps for the syntax bits 16, ignoring the all-zero codeword. The encoder 10 decides the subset of prediction modes to use based on complexity considerations and indicates that in the syntax bits 16. It also uses one entropy coder from the set of entropy coders 200-210 corresponding to the chosen subset, to indicate the chosen modes for the encoded macroblocks 30-32 generating the mode indicators 40-42. The decoder 50 uses the information contained in the syntax bits 16 in the encoded video signal 12 to select one of the entropy decoders 100-110 for handling the encoded macro-blocks 30-32 and corresponding mode indicators 40-42. Each new set of syntax bits 16 in the encoded video signal 12 may be used to reselect the entropy decoders 100-110 as the encoded video signal 12 may adapt over time to encoding complexity.

In some embodiments, a constraint may be placed on the possible subsets of the n possible prediction modes. For example, a constraint on the number of possible subsets may be used to reduce the number of entropy coders. In one embodiment, only a set of t possible subsets of the n possible prediction modes is allowed, where t is less than or equal to $2^n-1$. In the above example of n=5, the syntax bits 16 may be constrained to the following t=8 selections of {00111, 01011, 10001, 11001, 10000, 11101, 11111, 11110}. A coding mechanism may be implemented in the syntax bits 16 to specify which of the t possible subsets is in effect. For the above 8 selections a 3-bit fixed length code may be used to indicate which of the 8 subsets are selected. This reduces the total number of entropy coders 100-110 to t=8 rather than $2^n-1=31$.

A further restriction may be placed on the specific type of subsets of n possible prediction modes. The prediction modes 1-$n$ may be ordered in a specific manner so that the syntax bits 16 specify the number of prediction modes searched in an ordered list. For example, if the number of possible prediction modes is n=5 then there may be 5 possible selections of {10000, 11000, 11100, 11110, 11111}, where each selection corresponds to a specific number of modes searched in the ordered list. Thus, 10000 corresponds to the case where only the first prediction mode is searched, 11000 corresponds to the case where the first two prediction modes are searched, 11100 corresponds to the case where the first three prediction modes are searched, and so on until 11111, where all prediction modes are searched. In this example, the syntax bits 16 need only carry a number between 1 and n. Only n possible entropy coders are required, i.e. one for each of the n subset selections. Another advantage of this restriction is that a single parametric entropy coder may be designed based on the number of modes selection. For example, a set of terminated infinite tree-codes (Exp-Golomb, etc.) codes can be used because the modes are typically ordered based on frequency of occurrence.

An even further restriction may be placed on the set of possible selections. Rather than allowing n possible ordered subsets, a smaller number 1 (1<n) may be allowed in the ordered list. For the n=5 example, only four: {10000, 11100, 11110, 11111} may be allowed, corresponding to 1, 3, 4 and 5 modes respectively in ordered list. The syntax bits 16 then carry a number between 1 and 1 to specify the exact subset. Only 1 entropy coders are required, i.e. one for each of the 1 selections.

The encoded macro-blocks 30-32 that are encoded using an INTER prediction mode convey a set of motion vectors. A motion vector is an x,y data pair in which x and y have a resolution specified in a video encoding standard used in the video system 100. The H.264/AVC video encoding standard, for example, specifies ¼-pixel resolution for motion vectors. In future video encoding standards, even higher resolution, for example ⅛-pixel or ¹⁄₁₆-pixel may be supported.

A video encoding standard that imposes a requirement of relatively high resolution, e.g. ¼-pixel resolution, for motion vectors increases the complexity of video encoding performed by the encoder 10. For example, generating motion vectors having a relatively high resolution requires a relatively high complexity for both searching for the motion vectors and interpolation of the reference video frames. The encoder 10 may reduce the resolution of the motion vectors to yield a substantial complexity reduction. For example, the encoder 10 may reduce the resolution of the motion vector search to only ½-pixel even if the video encoding standard in use specifies a ¼-pixel or higher resolution. The encoder 10 signals the reduction in motion vector pixel resolution to the decoder 50 using a set of additional syntax bits that are carried in a higher level of the encoded video signal 12, e.g. the frame level or the GOP level. The additional syntax bits enable the decoder 50 to correctly use the motion vectors carried in the encoded macro-blocks 30-32. The lower resolution motion vectors carried in the encoded video signal 12 reduce the bit rate of the encoded video signal 12 in comparison to full resolution of the motion vectors specified in a video encoding standard.

In one embodiment, there are p possible motion vector resolution modes that may be employed by the encoder 10. The additional syntax bits in the encoded video signal 12 that specify motion vector resolution specify a number between 1 and p that indicates which of the p resolution modes are applicable to the motion vectors in the encoded video signal

12. A video encoding standard may be used to specify which index between 1 and p maps to which resolution. Each possible resolution corresponds to an entropy coder for the motion vectors which results in p entropy coders. The entropy coders may be parameterized and derived from a single parent. For example, if the possible resolution modes are integer-pixel, ½-pixel, ¼-pixel and ⅛-pixel, then the 4 entropy coders may be derived from a parent integer-pixel entropy coder and then adding fixed-length bits for increasing the resolution progressively to ½, ¼ or ⅛-pixel resolution.

The encoded video signal may include provisions for carrying the additional syntax bits in multiple levels of the bitstream, such as GOP, frame, slice or macroblock level in high to low level order, where information at the lower levels is generally used to supercede the information at the higher levels. However there is a special requirement at the frame level as explained below.

The additional syntax bits that apply at the frame or GOP level of the encoded video signal 12 determines the interpolation that needs to be conducted on reference video frames at both the encoder 10 and the decoder 50. Within a video frame, e.g. at the slice level or the encoded macro-block level, the resolution may be reduced further from the resolution specified in the additional syntax bits at the frame or GOP level that is effective at the frame level. For example, if the frame level syntax bits specify ¼-pixel resolution, then within the frame at a slice level a set of slice level syntax bits may further reduce resolution to ½-pixel resolution. The resolution cannot be increased beyond that effective at the frame level of the encoded video signal 12.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for video communication, comprising adapting an encoded video signal to an encoding complexity used to derive a set of encoded data from a series of video frames,
    wherein adapting comprises generating a set of syntax bits in the encoded bit stream such that the syntax bits specify the encoding complexity and identify a subset of a set of possible prediction modes,
    wherein the method further comprises evaluating a set of prediction modes identified in the encoded video signal using the syntax bits,
    wherein evaluating comprises parsing a set of bits in the encoded video signal to determine a set of mode identifiers carried in the encoded video signal.

2. The method of claim 1, wherein the syntax bits are carried in a higher level of the encoded video signal than a data level that carries the encoded data.

3. The method of claim 1, wherein adapting an encoded video signal includes adapting a set of bits in the encoded video signal that are used to identify a set of prediction modes.

4. The method of claim 1, wherein generating a set of syntax bits includes generating a set of syntax bits that provide a bit map of the subset.

5. The method of claim 1, wherein generating a set of syntax bits includes generating a set of syntax bits that provide a code that identifies the subset.

6. The method of claim 1, wherein generating a set of syntax bits includes generating a set of syntax bits that include a number of selections from an ordered list for identifying the subset.

7. The method of claim 1, further comprising generating a set of syntax bits in the encoded video signal that specify a resolution for a set of motion vectors carried in the encoded video signal.

8. The method of claim 7, further comprising generating a set of lower level syntax bits in the encoded video signal that specify a change in the resolution.

9. A video system, comprising:
    encoder that adapts an encoded video signal to an encoding complexity used to derive a set of encoded data from a series of video frames;
    decoder that evaluates the encoded video signal in response to the encoding complexity,
    wherein the encoder generates a set of syntax bits in the encoded video signal that identify a subset of a set of possible prediction modes,
    wherein the syntax bits provide a bit map of the subset, provide a code that identifies the subset, and specify a number of selections from an ordered list for identifying the subset.

10. The video system of claim 9, wherein the encoded video signal includes a set of syntax bits that specify the encoding complexity.

11. The video system of claim 10, wherein the syntax bits are carried in a higher level of the encoded video signal than a data level that carries the encoded data.

12. The video system of claim 10, wherein the decoder evaluates a set of prediction modes identified in the encoded video signal using the syntax bits.

13. The video system of claim 10, wherein the decoder parses a set of bits in the encoded video signal to determine a set of mode identifiers carried in the encoded video signal.

14. The video system of claim 9, wherein the encoder adapts a set of bits in the encoded video signal that are used to identify a set of prediction modes.

15. The video system of claim 9, wherein the encoder generates a set of syntax bits in the encoded video signal that specify a resolution for a set of motion vectors carried in the encoded video signal.

16. The video system of claim 15, wherein the encoder generates a set of lower level syntax bits in the encoded video signal that specify a change in the resolution.

* * * * *